(12) United States Patent
Nakamura et al.

(10) Patent No.: US 6,337,530 B1
(45) Date of Patent: *Jan. 8, 2002

(54) AC GENERATOR FOR VEHICLE WITH HELICAL STATOR HAVING BOLT RECESSES ON OUTER CYLINDRICAL SURFACE

(75) Inventors: Shigenobu Nakamura, Anjo; Tsutomu Shiga, Nukata-gun, both of (JP)

(73) Assignee: Denso Corporation, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,605

(22) Filed: Jun. 11, 1999

Related U.S. Application Data

(63) Continuation of application No. PCT/JP97/03770, filed on Oct. 17, 1997.

(51) Int. Cl.[7] ............................. H02K 1/18; H02K 1/16
(52) U.S. Cl. ....................................... 310/258; 310/216
(58) Field of Search ................................. 310/217, 216, 310/258, 263, 259, 91

(56) References Cited

U.S. PATENT DOCUMENTS

| | | | | |
|---|---|---|---|---|
| 921,914 A | * | 5/1909 | Timmerman | 310/258 |
| 2,023,259 A | * | 12/1935 | Anderson | 172/36 |
| 2,393,065 A | * | 1/1946 | Rose | 310/217 |
| 2,582,005 A | * | 1/1952 | Carlson | 310/217 |
| 3,200,275 A | * | 8/1965 | Lindgren | 310/90 |
| 4,494,030 A | | 1/1985 | Mulach et al. | 310/256 |
| 4,959,577 A | * | 9/1990 | Radomski | 310/263 |
| 5,475,276 A | | 12/1995 | Shiga et al. | 310/154 |

FOREIGN PATENT DOCUMENTS

| | | | | |
|---|---|---|---|---|
| DE | 28 06 971 | * | 8/1979 | 310/258 |
| EP | 0 116 649 | | 8/1984 | |
| FR | 798787 | * | 5/1936 | 310/258 |
| GB | 626118 | * | 7/1949 | 310/258 |
| JP | 50-107409 | | 8/1975 | |
| JP | 52-139902 | * | 11/1977 | 310/217 |
| JP | 64-47537 | | 3/1989 | |
| JP | 2-95147 | | 4/1990 | |
| JP | 7-31086 | | 1/1995 | |
| JP | 7-245901 | | 9/1995 | |

* cited by examiner

*Primary Examiner*—Karl Tamai
(74) *Attorney, Agent, or Firm*—Pillsbury Winthrop LLP

(57) ABSTRACT

A stator core of an AC generator for vehicles is laminated by helically winding a band-like steel plate and is formed to be approximately cylindrical. A yoke of the stator core is held between a pair of frames. An axial extending groove-like recess is provided in the outer peripheral portion of the stator core, and a through-bolt is arranged within the recess. It is possible to provide an AC generator for vehicles at low cost in which an axial center position of the through-bolt is controlled to thereby considerably reduce a moment component when the through-bolt is axially fastened to prevent an occurrence of looseness of the through-bolt and which prevents output from lowering, is small in size, is excellent in the resistance to vibration, and is low in noise.

18 Claims, 6 Drawing Sheets

AC GENERATOR FOR VEHICLE WITH HELICAL STATOR HAVING BOLT RECESSES ON OUTER CYLINDRICAL SURFACE

This is a Continuation International Application No. PCT/JP97/03770 filed Oct. 17, 1997.

TECHNICAL FIELD

The present invention relates to an AC generator for vehicles loaded on cars, trucks and so on.

BACKGROUND ART

The engine room size has been narrower recently due to the slanted nosings for reducing vehicle running resistance and the need for securing a residential space of compartments, and there is no room for a loading space for an AC generator for vehicles. On the other hand, the number of revolutions of the engine is lowered and the rotation of the AC generator for vehicles is also lowered for improving fuel cost, whereas an increase in electric loads such as safety control appliances is requested, resulting in demands on increasing enhancement of generation performance. Further, power has been increased while the engine is miniaturized and reduced in weight, and as a result, vibrations increase, and vibrations applied to a generator loaded on the engine also increase.

Further, engine noises have been lowered recently due to the social need for reduction in noise outside the vehicle and the improvement in quality of the goods in terms of enhancement of silence of compartments. In particular, magnetic noise of the AC generator for vehicles caused by generation is offensive to the ear.

As described above, it is desirable to provide at low cost an AC generator for small vehicles that, has a high output, is excellent in resistance to vibration, and is low in noise production.

On the other hand, in the conventional AC generator for vehicles, when a stator is held and secured to both front and rear frames, a plurality of flanges are provided in a direction of external diameter at a position in which both the frames are opposed in the vicinity of an end of an opening of the frame in contact with a stator core 32, the flanges being formed with bolt hole or threaded holes and fastened and secured by means of through-bolts. In the above-described construction, however, since the flanges of the frames are axially fastened at an external diametrical position of the frames, a moment component force M is applied as shown in FIG. 9 so that the end of the opening of the bowl-like frame becomes distorted, and an axial contact surface between the stator core and the frame reduces. Thereby, the surface pressure of the contact surface rises and therefore is shaved and worn by the edge of the end of the stator core which is formed of iron replaced by aluminum which has been generally used as material for frames. Under the current environment in which vibrations from the outside are applied to the generator as mentioned above, such wear is further accelerated. As the wear progresses, the axial distance between the frames shortens, and the through-bolts by which the stator core and the frames are fastened and secured axially become loosened, leading to the following problem. That is, the center axis between the rotor and the stator is deviated so that an air gap between the outer periphery of the rotor and the inner periphery of the stator becomes uneven, and a magnetic attraction thereof generated through the air gap also becomes uneven, whereby the magnetic noises increase.

Further, since the rigidity of the entire generator lowers sometimes the external vibrations and resonance phenomenon by which the stator core relatively rotates in a peripheral direction between the frames to break a connecting wire between a stator winding and a rectifier, leading to a danger of a stoppage of generation. Further, the vibrations of the entire generator is rapidly increased due to the resonance, whereby an excessive stress is applied to various parts such as a rectifier to possibly break them.

On the other hand, from the viewpoint of providing an inexpensive generator, the stator core of the generator is generally a helical type core formed by winding a band-like steel plate helically. In this case, both axial ends which are a beginning of winding and a termination of winding have the same inclination of 90° with respect to the center axis. The contact surface between one axial end and the frame further reduces in contact surface, and in the other contact surface, it slides along the inclination of the contact surface of the stator so that the opening of the frame tends to spread, thus reducing the axial distance between both the frames. In the above-described helical type stator core, occurrence of looseness of the through-bolts is accelerated.

Further, as compared with the core in which separated steel plates are laminated, the helical type stator core is formed of a thin steel sheet for facilitating helical winding, and therefore the rigidity is lowered. Thereby, the stator core tends to be deformed by the fastening force of the through-bolts. There is also a problem of an increase in magnetic noise caused by deterioration of circularity of an inner periphery.

As a countermeasure against the above-described problem, there is employed a hot insert system in which an interference fit is used for fitting between the frame and the stator core, and when assembled, the frame is heated in advance, not merely depending on fixed through-bolts between the frame and the stator core.

It is also contemplated that the axial fastening force of the through-bolts is increased to thereby increase the securing force between the stator core and the frame. In this case, however, the moment component force M increases, and the end of the opening of the bowl-like frame is further distorted. It is therefore contemplated that a cylindrical outer peripheral portion of the frame is increased in thickness to increase the rigidity of the frame in an attempt to reduce the distortion.

On the other hand, by the increase of the moment component force M, the stator core in the vicinity of the through-bolts is deformed toward the inner peripheral side so that the circularity of the inner periphery of the core is deteriorated. This gives rise to a new problem in that an air gap between the outer periphery of the rotor and the inner periphery of the stator is uneven, and the magnetic noises increase. In the helical type stator core whose rigidity is low, this tendency is notable. To solve this problem, notches are provided in the vicinity of flanges of frames for fastening through-bolts to prevent deformation of the stator core, as disclosed in Japanese Patent Application No. Hei 7-245901.

In the above-described hot insert system, the number of production steps and equipment therefor increase, impeding a supply of an inexpensive generator. Further, when a temperature of the generator caused by generation rises, fitting becomes loosened due to a difference in expansion coefficient between aluminum which is a material for the frame and iron which is a material for the rotor core 32, and if sufficient interference fit is intended to be secured under the aforesaid conditions, a large tensile stress is conversely always applied to the frame when the vehicle stops to pose a problem of a crack of the frame in the cold district. If the frame is made of the same iron as the stator core 32, the looseness of fitting caused by the difference in expansion coefficient disappears but there poses problems of a lowering of output caused by leakage of magnetic flux, and a considerable increase in processing cost and weight. In the case where the helical type stator core is used, the rigidity lowers as described above. Therefore, there is a problem in that deformation due to the interference fit between the core and the frame increases, and the circularity of the inner periphery is deteriorated and as a result, the magnetic noises increase.

Further, in the method of making a wall-thickness larger to increase the rigidity of the frame in order to reduce the deformation and distortion of the opening of the frame. It is necessary for obtaining sufficient effects to considerably increase the thickness of outside diameter of the entire frame to pose a problem of increasing the loading space for the engine and the weight.

Furthermore, in the method of the above-described Japanese Patent Application No. Hei 7-245901, in the contact surfaces other than the flanges, the distortion of the end of the opening of the frame caused by the moment component force M and the occurrence of the wear of the contact surface accompanied thereby remain the same as prior art, and the problem of lowering the fastening force of the bolts is not solved. Further, the problem of the increase in magnetic noises caused by the deterioration of the circularity of the inner periphery in the case where the helical type stator core whose rigidity is low is used still exists.

DISCLOSURE OF THE INVENTION

The present invention solves the conventional problems as noted above. It is an object of the present invention to provide at low cost an AC generator for vehicles which prevents an occurrence of looseness of through-bolts, is small in size, has a high output, is excellent in resistance to vibration, and is low in noise.

For solving the above-described problems, in the generator according to the present invention, a recess is provided in an axial direction of an outer peripheral portion of a helical stator core, and an axial center position of a through-bolt guided in the recess is controlled to thereby considerably reduce a moment component when the through-bolt is axially fastened, to suppress a wear of a contact surface between a frame and the stator core, and to suppress an occurrence of looseness of the through-bolt as well as deformation of the helical stator core to prevent an increase in magnetic noise.

According to the first aspect of the invention, there is provided an AC generator for vehicles comprising, a field rotor having a fan at least on one side of an axial end, a stator arranged oppositely of the outer periphery of the rotor and comprising a laminated core having a plurality of slots on the inside diameter side and a yoke on the outside diameter side and a stator coil housed in the slot, a pair of bowl-shaped frames for supporting the rotor and the stator, and a through-bolt for axially fastening and fixing the stator by the pair of frames, characterized in that the stator coil is formed by helically winding and laminating a band-like steel plate to have an approximately cylindrical shape, the yoke has axial both ends placed in contact with an approximately end of an opening of a bowl-like portion of the frames, the approximately cylindrical stator core is formed in its outer peripheral surface with a plurality of axially depressed recesses, and an axial center of the through-bolt is arranged on or within a first prescribed circle, wherein said first prescribed circle has a diameter which is larger than a largest outside diameter of the stator core by $2 \times \frac{1}{3}$ of the diameter of the through-bolt. A moment component caused by an axial fastening force of the through-bolt is considerably reduced, and a distortion of the end of the opening of the frame is suppressed. Therefore, an axial contact area between the stator core and the frame can be secured so that progress of a wear of the frame contact surface is prevented, the axial fastening force of the through-bolt is retained, and almost all of the axial fastening force acts for the purpose of fixing the stator core and the frames, thus enhancing the rigidity of the entire generator, and withstanding the recent severe environment of external vibration conditions from the engine. Particularly, in the case where the helically wound and laminated helical type stator coil is used, further reduction of one frame contact area caused by inclination of both ends in the axial direction of the core and easiness of spreading caused by sliding of the other frame opening are overcome. The retaining effect of the axial fastening force of the through-bolt is further enhanced as compared with the conventional fastening and fixing construction. Further, since deformation caused by the lower rigidity of the helical type stator core is suppressed, magnetic noises caused by deterioration of circularity of the inner periphery are not increased.

According to the second aspect of the invention, there is provided the AC generator for vehicles according to the first aspect of the invention, wherein the recess is approximately semicircular, and the through-bolt is circular in section, and wherein the through-bolt is guided by the semicircular recess.

Since the outside diameter of the through-bolt is guided along the recess when the through-bolt is mounted, the external thread is easily inserted into the internal thread. It is not necessary to apply a large guide to the opening of the internal thread, resulting in facilitating the mounting and processing.

According to the third aspect of the invention, there is provided the AC generator for vehicles according to the first or second aspect of the invention, wherein the laminated core is joined by welding along the axial direction in the recess surface. The rigidity of the recess on which a compressive force acts due to the fastening of the through-bolt is further enhanced to prevent deformation of the stator core 32 whereby an increase in magnetic noise caused by the defective circularity of the inner periphery disappears, and a build-up of weld is not present in the vicinity of the contact surface between the core and the frame, thus enhancing the mounting workability.

According to the fourth aspect of the invention, there is provided the AC generator for vehicles according to any one of the first to third aspects of the invention, wherein the outer peripheral surface of the through-bolt is extremely close to the recess in a portion opposed to the recess. A magnetic line of force is caused to pass through the through-bolt whereby a magnetic path in the stator core 32 is enlarged as compared with the case where the outer peripheral surface of the through-bolt is not close to the recess, thus enhancing the output.

According to the fifth aspect of the invention, there is provided the AC generator for vehicles according to any one of the first to fourth aspects of the invention, wherein the stator coil is that at least a portion positioned in the slot is approximately rectangular along the slot shape, and the slot is approximately filled with a plurality of coils. Since the rigidity of the entire stator is enhanced, deformation of the stator core caused by the fastening of the through-bolt and defective circularity of the inner periphery of the stator core resulting therefrom are prevented not to increase magnetic noises.

According to the sixth aspect of the invention, there is provided the AC generator for vehicles according to the first aspect of the invention, whereby an axial center of the through-bolt is arranged on or out of a second prescribed circle, wherein said second prescribed circle has a diameter which is smaller than the largest outside diameter of the stator core by $2 \times \frac{2}{3}$ of a diameter of the through bolt. The moment component caused by the axial fastening force of the through-bolt is considerably reduced whereby progress of a wear of the frame contact surface is prevented, the axial fastening force of the through-bolt is held, the deformation of the helical type stator is suppressed to eliminate an increase in magnetic noises, and in addition, lowering of output caused by reduction in magnetic path area in a magnetic circuit can be suppressed.

BEST MODE FOR CARRYING OUT THE INVENTION

Figure 1:
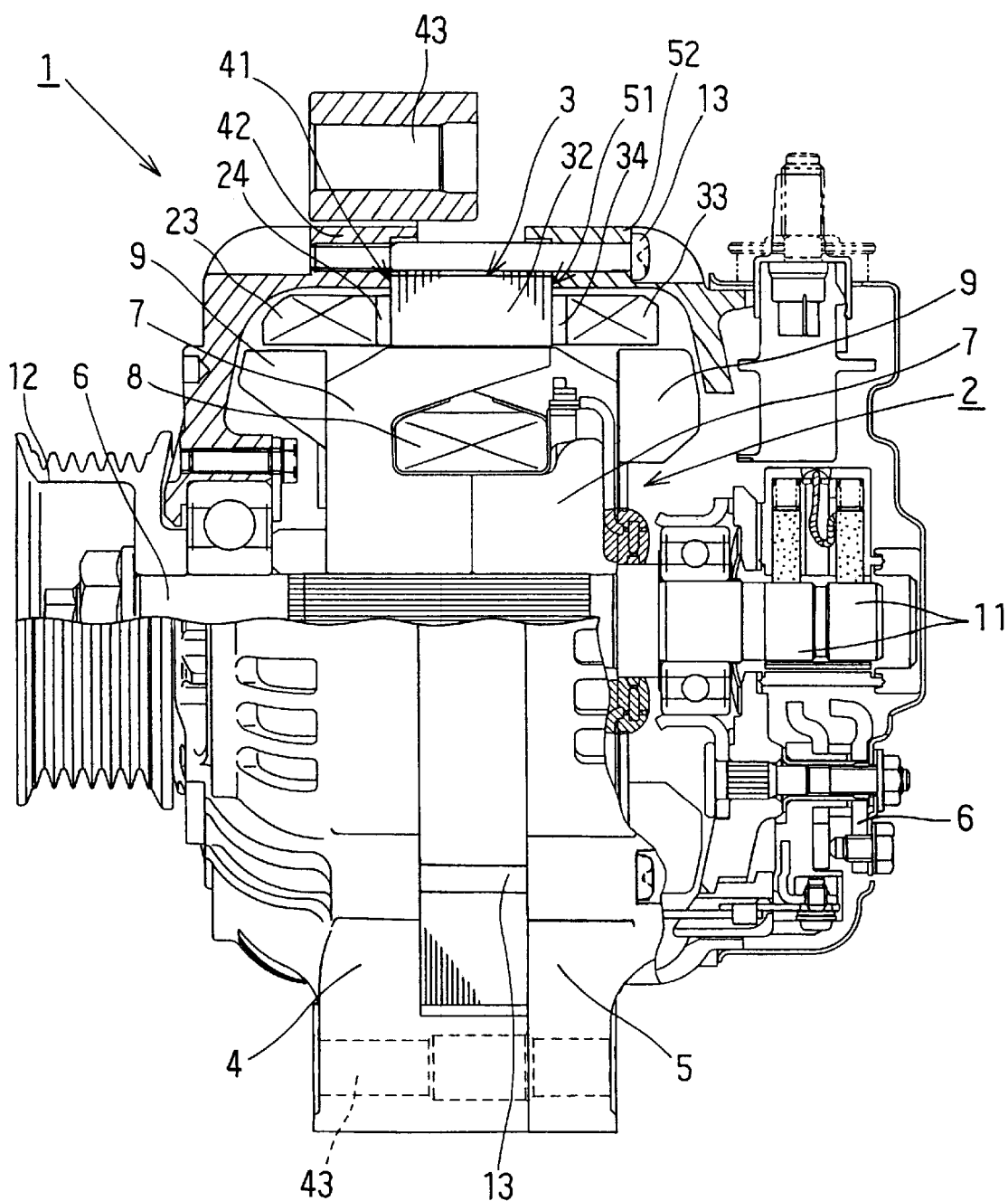
FIG. 1 is a sectional view of main parts of an AC generator for vehicles according to the present invention.

An AC generator for vehicles according to the present invention will be explained hereinafter on the basis of embodiments shown in the drawings.

Figure 2:
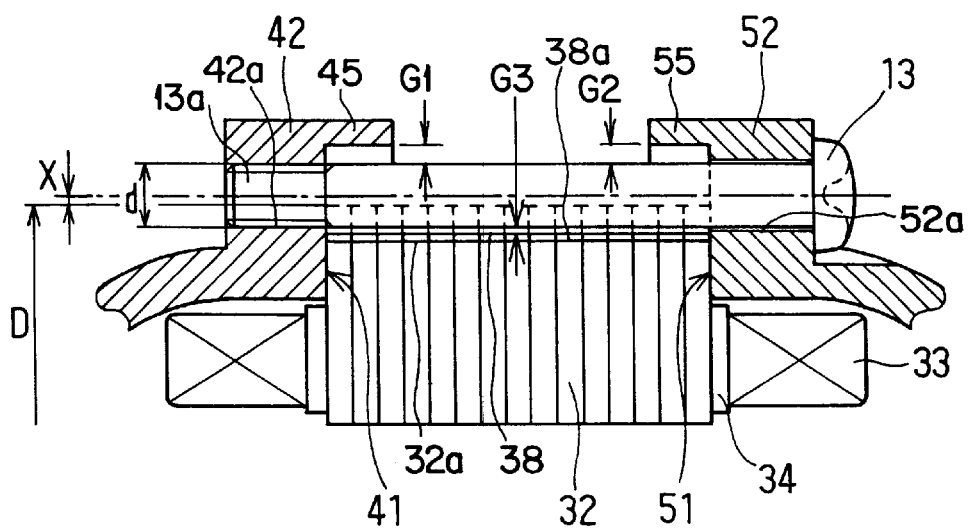
FIG. 2 is an axial sectional view of peripheries of a stator according to a first embodiment of the present invention (except a rotor).
Figure 3:
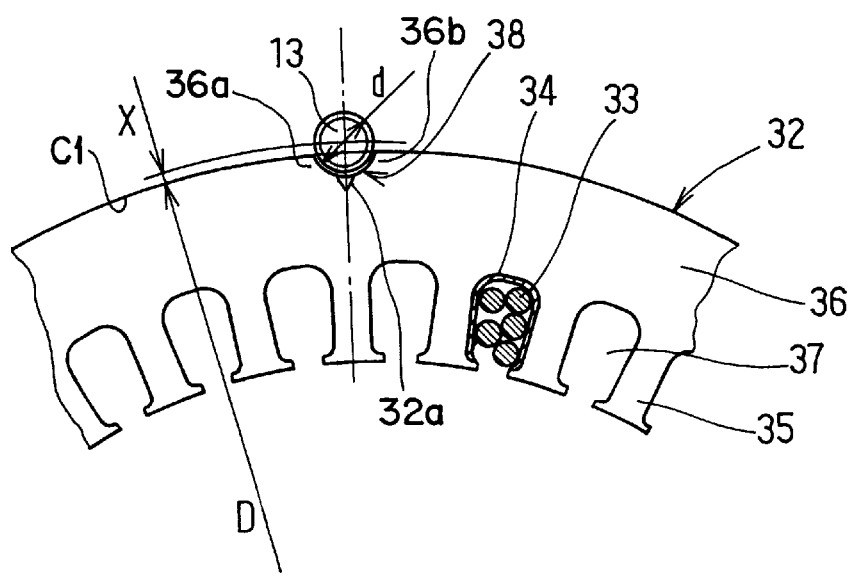
FIG. 3 is a diametrical sectional view of peripheries of a stator according to the first embodiment (a partial sectional view of a stator illustrating a part of a stator coil except a rotor).

FIGS. 1 to 3 show a first embodiment of this invention. FIG. 1 is an axial sectional view of main parts of an AC generator for cars according to the present invention, FIG. 2 is an axial sectional view of peripheries of a stator according to the present embodiment (except a rotor), and FIG. 3 is a diametrical sectional view of peripheries of a stator according to the present embodiment (showing a part of a stator coil except a rotor). An AC generator for vehicles 1 comprises a rotor 2 functioning as a field, a stator 3 functioning as an armature, frames 4, 5 for supporting the rotor and the stator, a rectifier 6 electrically connected to the stator 3 to convert AC power to DC and so on.

The rotor 2 rotates integral with a shaft 6, and comprises two sets of Lundell type pole cores 7, a cooling fan 9, a field coil 8, a spring 11 and so on. The shaft 6 is connected to a pulley 12 and is rotatively driven by a running engine (not shown) loaded on the car.

Figure 4:
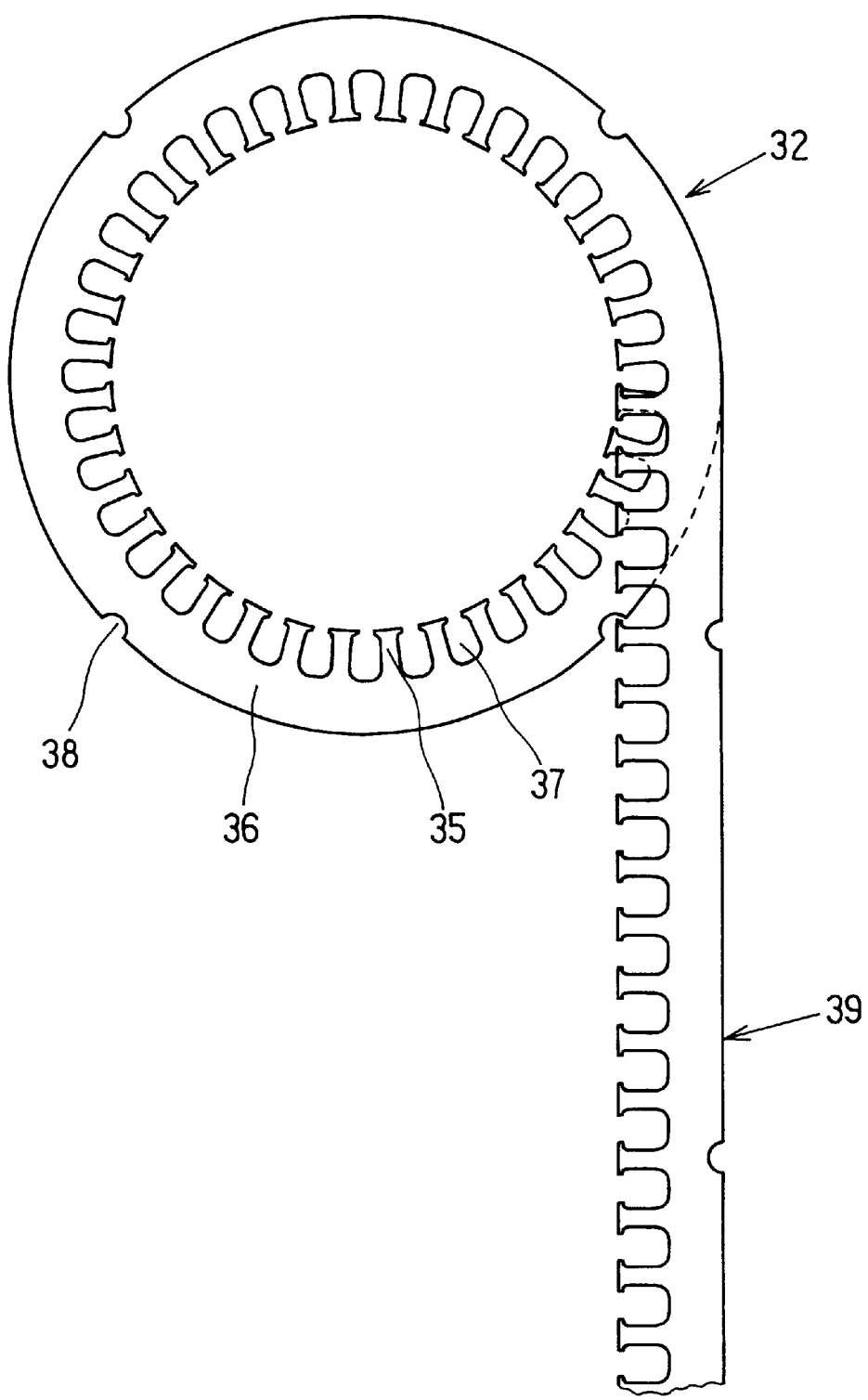
FIG. 4 is a view showing a method of producing a stator core 32.

The stator 3 comprises a stator core 32, a stator coil 33, and an insulator 34 for electrically insulating between the core and the stator coil. The stator core 32 comprises a magnetic pole tooth portion 35 and yoke portion 36. A winding 33 and an insulator 34 are housed in a slot portion 37 surrounded by the magnetic tooth portion 35 and the yoke portion 36. As shown in FIG. 4, the stator core 32 helically winds a band-like steel plate 39 so that the outer periphery of the yoke portion 36 is approximately cylindrical. A plurality of approximately semicircular recesses 38 are formed in an axial direction in the outer peripheral surface, and a center line of the width in a peripheral direction of the recess 38 substantially matches a center line of the width of the magnetic pole tooth portion 35. As shown in FIG. 4, the recesses 38 are formed by press processing or the like in advance at the stage of the band-like steel plate 39.

Referring to FIG. 2, the laminated core 32 is joined by welding 32a along an axial direction in a surface of the recess 38.

The frames 4, 5 have an approximately bowl shape, and are in contact, in their ends 41, 51 on the opening side thereof, with axial both ends on the outside diameter side of the yoke portion 36. In the vicinity of the ends 41, 51 on the opening side, a plurality of paired flanges 42, 52 are formed in the direction of outside diameter, having a through-hole through which a through-bolt 13 extends for one side, and a threaded hole for the other side. The frames 4, 5 and the stator 3 are mutually arranged at positions corresponding to the plural paired flanges so that the recesses 38 of the stator core 32 match the corresponding portions of the flanges, and the through-bolt 13 inserted through the through-hole of the flange is guided by the recess 38 and inserted and mounted in the threaded hole of the opposed flange. The axial both ends of the stator core 32 are held and fixed on the frames 4, 5 by the axial fastening force of the through-bolt 13.

Referring to FIG. 2, a bottom 38a of the recess 38 is located slightly inward from a radial innermost portion of a hole 52a. The frames 4,5 have cover portions 45, 55 located radially outside of the stator core 32. The cover portions 45, 55 extend axially from the flanges 42, 52 of the frame 4,5. The cover portions 45, 55 form bores with the outer surface of the stator core 32. The through-bolt 13 is placed between the recess 38 and the cover portions 45, 55. The cover portions 45, 55 and the through-bolt 13 form radial gaps G1, G2 larger than a gap G3 formed between the bottom 38a and the through-bolt 13.

The bore formed between the cover portion 45 and the stator core 32 receives the tip 13a of the through-bolt 13 when it is installed, and guides it to the left side hole 42a. Therefore, the tip 13a of the through-bolt 13 is guided by the bottom 38a of the recess 38 when the through-bolt 13 is installed from the right side to the left side, and the tip 13a can reach the left side threaded hole 42a easily.

Referring to FIG. 3, opposite ends of the stator core 32 have receiving regions 36a, 36b being lain on both circumferential sides of the depression formed by the recess 38. The receiving regions 36a, 36b receive the fastening force of the through-bolt 13. The through-bolt 13 partially protrudes from the largest outside circle C1 of the stator core 32. The recess 38 has a semicircular surface having a diameter slightly larger than that of the through-bolt 13. The recess 38 has a depth which is insufficient to cause the through-bolt to be located within the largest outside circle C1 of the stator core 32.

In FIGS. 2 and 3, assume that D is the imaginary largest outside diameter of the stator core 32, d is the largest diameter of an inscribed circle of an axial section of the through-bolt, and X is a distance between an axial center of the through-bolt 13 and an imaginary largest outside circle C1 of the stator core 32, X is arranged to be not more than $\frac{1}{3}$ of d. Here, the imaginary largest outside diameter D indicates a diameter of the imaginary largest outside circle C1 formed by connecting the maximum point of the radius in the axial end of the stator core 32. Therefore, the centers of the through-bolts are arranged on or within a first pre-scribed circle. The first prescribed circle has a diameter D1 which is larger than the imaginary largest diameter D of the stator core 32 by $2 \times \frac{1}{3}$ of the diameter d of the through-bolt. The diameter D1 is represented by $D1 = D + 2 \times \frac{1}{3} \times d$.

Figure 5:
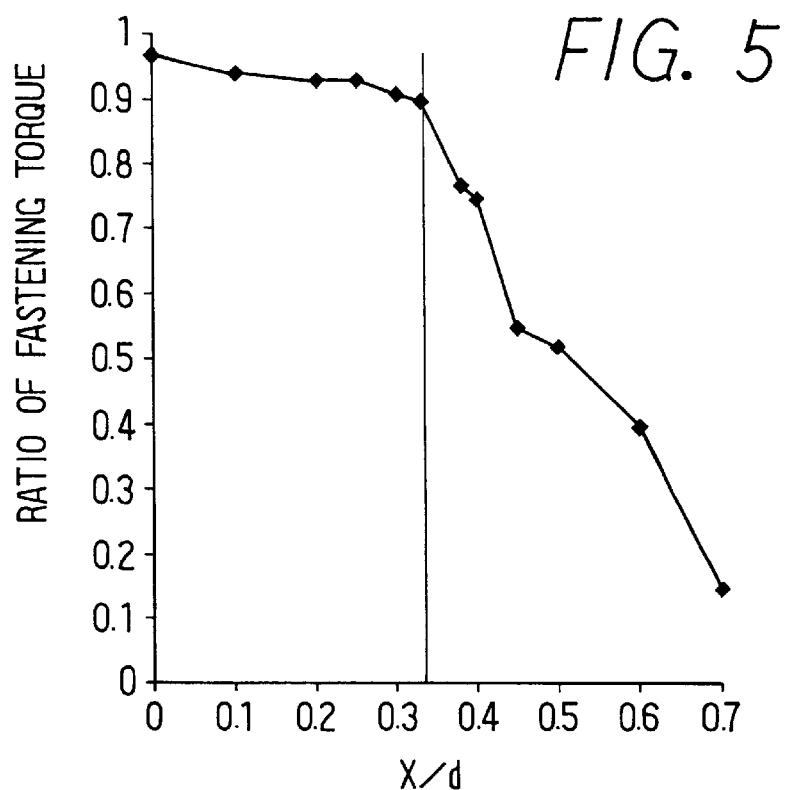
FIG. 5 is a graph showing a relationship between a diametrical position of a through-bolt and a torque of the bolt.
Figure 6:
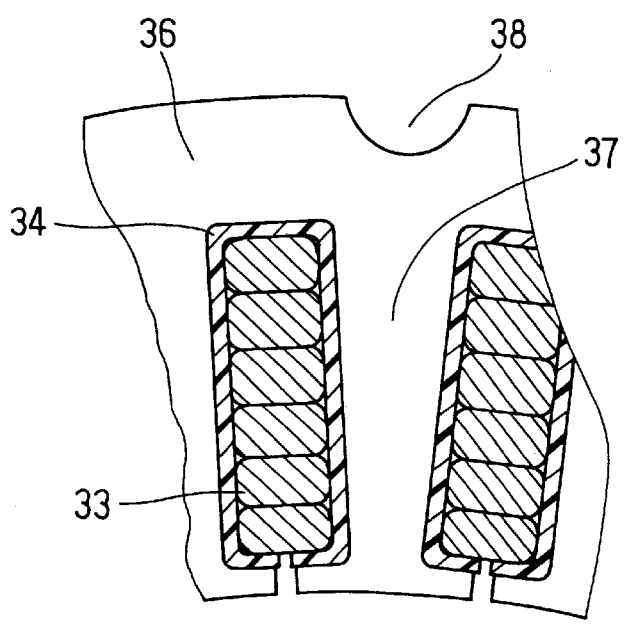
FIG. 6 is a partial sectional view of a stator in the case where a stator coil is approximately rectangular along the slot shape.

FIG. 5 shows ratios of the bolt fastening torque after the test to the bolt fastening torque before the test. In the test, the frames except the different diametrical position of the through-bolt are prepared. The torque of the through-bolt 13 is measured, after the ratio X/d is varied and a vibration test in a single AC generator for vehicles is conducted. In the vibration test, the AC generator for vehicles is fastened and fixed on a mounting jig on an excitation board by bolts and nuts using mounting holes formed in the frame. The vibration conditions are the acceleration of 200 m/S2 and the frequency of 100 Hz to 400 Hz in consideration of the vibration environment applied to the generator loaded on the engine. Under the condition, the number of frequency is increased and decreased for 5 minutes, and the excitation is made in the diametrical direction and in the axial direction for 10 hours, respectively. The through-bolt 13 is M5 (JIS) thread generally used in the AC generator for vehicles, and the stator is held between both the frames by means of four through-bolts. As a result, it has been found that if X is set to not more than $\frac{1}{3}$ of d, the reduction in torque of the through-bolt 13 is considerably improved. That is, by the aforesaid setting, it is possible to prevent an increase in magnetic noise caused by the looseness of bolts, a breakage of the coil caused by the rotation of the stator, and a damage of various parts caused by the vibrations.

Figure 9:
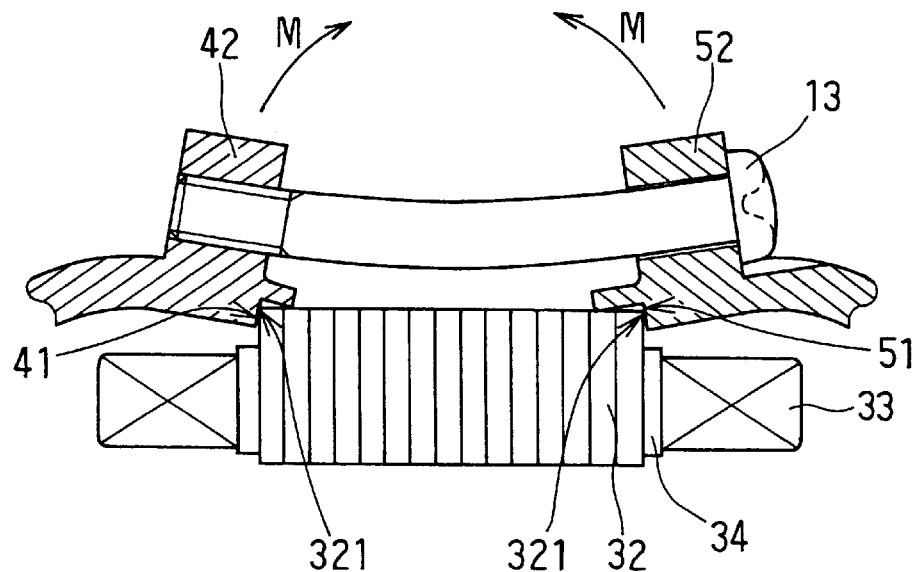
FIG. 9 is an sectional view of a stator according to the prior art.

The reason that the looseness of the bolts increases when the ratio X/d is large will be explained below with reference to FIGS. 9 and 10. As shown in FIG. 9, when the through-bolt 13 is positioned externally in the diametrical direction from the outer periphery of the stator core 32 and the flanges 42, 52 are axially tightened by the through-bolt 13, a moment component M about axial both side edges 321 of the stator core 32 occurs so that ends 41, 51 of the frame opening are inclined toward the stator core 32 and as a result, the ends 41, 51 of the frame opening and the stator core 32 come in contact only at the side edges 321. Therefore, face pressure of the contact portion is high. In addition, since the stator occupies a greater part of weight in the generator, the load caused by the vibration is also large, and receives an axial vibration from the engine, thus further increasing the face pressure of the contact surface. The ends 41, 51 of the opening of the frame which is lower in hardness than the stator core 32 are shaved and worn. By the wear, the distance between the flanges becomes short, and the axial fastening force of the through-bolt 13 lowers, that is, loosens. Further, needless to say, the wear extends over the entire contact surface of the frame, and the vibrations of the generator are amplified to accelerate the wear.

Figure 10:
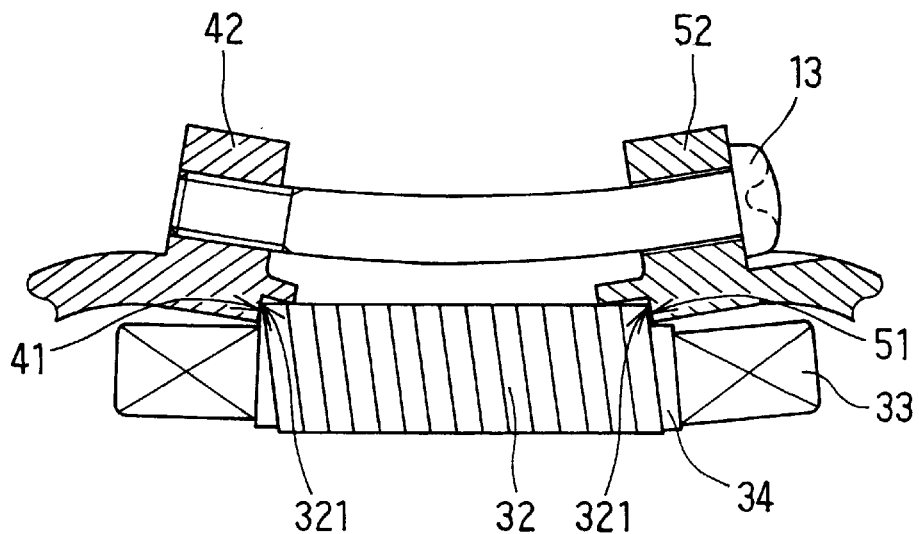
FIG. 10 is a sectional view of a stator according to the prior art.

FIG. 10 shows the contact situation between the stator core 32 and the ends 41, 51 of the opening of the frame in the case where use is made of the helical type stator core 32 formed by helically winding the band-like steel plate shown in FIG. 4. Since the steel plate is helically wound, both ends of the stator which correspond to a winding beginning and a winding terminal, respectively, are surfaces inclined in the same direction with respect to the vertical surface relative to the center shaft of the stator. Therefore, the end 41 of the opening of the frame shown in FIG. 10 tends to be early worn since in the axial end edge 321 of the stator core 32, higher face pressure than the case of FIG. 9 is loaded on the contact surface. In the other end 51 of the opening, since the inclination of the end 51 of the opening 51 is in the same direction as that of the end of the stator core 32, both the ends slide along the inclination so that the opening of the frame is easily spread, and as a result, the axial distance between both the frames reduces, and the through-bolt 13 tends to loose. From the foregoing, in case of the recent general helical type stator core 32, the through-bolt tends to be loosened more easily as compared with the case of the stator core 32 of the separation type laminated plate.

Since in the present embodiment, the moment component is considerably reduced to suppress the distortion of the opening, the deformation of the stator core 32 toward the inner peripheral side is suppressed, and magnetic noises caused by the defective circularity of the inner periphery of the stator core 32 are not increased.

In some of the AC generator for vehicles using the stator core 32 formed by laminating separated steel plates, X/d is present within the range of the present embodiment. However, the helical type stator core formed by helically winding a band-like steel plate is generally used for reducing the cost, resulting in lowering of the output. The reason is that the thickness of the steel plate becomes thinner, as the closer to the outer peripheral portion, and the laminate thickness of the stator core is controlled by the thickness of the steel plate of the inner peripheral portion, and thus the substantial magnetic path area in the stator core reduces by a thin portion of the outer peripheral portion, and the magnetic resistance on the magnetic circuit increases. Therefore, the through-bolt 13 is arranged externally of the periphery of the stator coil to eliminate the recess in the outer peripheral portion which narrows the magnetic path area in the stator core to thereby prevent the lowering of output.

In the present embodiment, a high cooling construction with a cooling fan arranged within the generator is employed to reduce heat loss and achieve higher output. Therefore, even if the recess is formed in the outer periphery of the helical type stator core, it is possible to secure the output which sufficiently fulfill with the need.

Since in the present embodiment, the through-bolt 13 is disposed extremely close to the recess 38, a magnetic line of force is also passed through the through-bolt whereby it is possible to bear, to some extent, a part of enlargement of a magnetic path area within the stator core 32 as compared with the case where the bolt is not close to the recess, thus enhancing the output.

(Other Embodiments)

While in the first embodiment, a conductor housed in the slot fills the slot with a clearance, the slot may be substantially completely filled with a conductor whose section is rectangular along the slot shape. The slot portion is integral with the yoke portion so that the rigidity of the entire stator is enhanced, thus enhancing a bearing force relative to the deformation of the stator core 32 caused by fastening of the through-bolt 13, and suppressing an increase in magnetic noises caused by the defective circularity of the inner periphery of the stator core 32.

While in the first embodiment, the recess 38 is formed in advance by press processing or the like at the stage of the band-like steel plate 39 prior to winding, the recess may be formed by removal processing after winding. While the recess 38 has an axial section of an approximately semicircle, if it is a guide for the through-bolt 13, the axial sectional shape may be polygons such as a triangle or a square.

Figure 7:
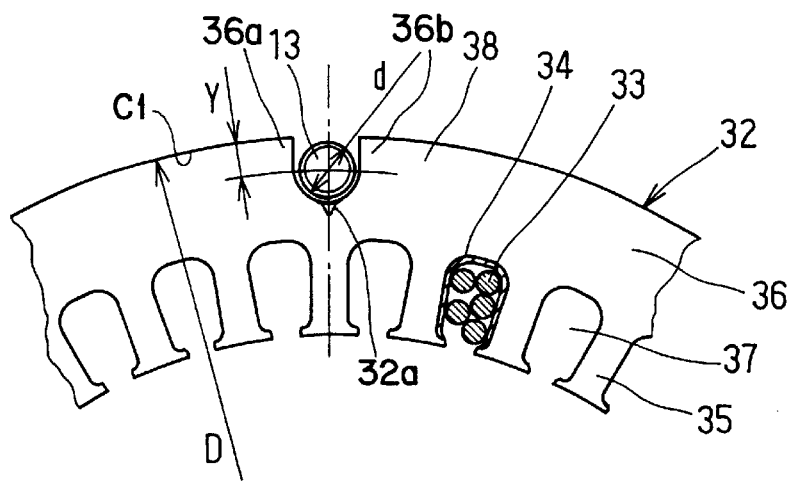
FIG. 7 is a diametrical sectional view of peripheries of a stator according to another embodiment.
Figure 8:
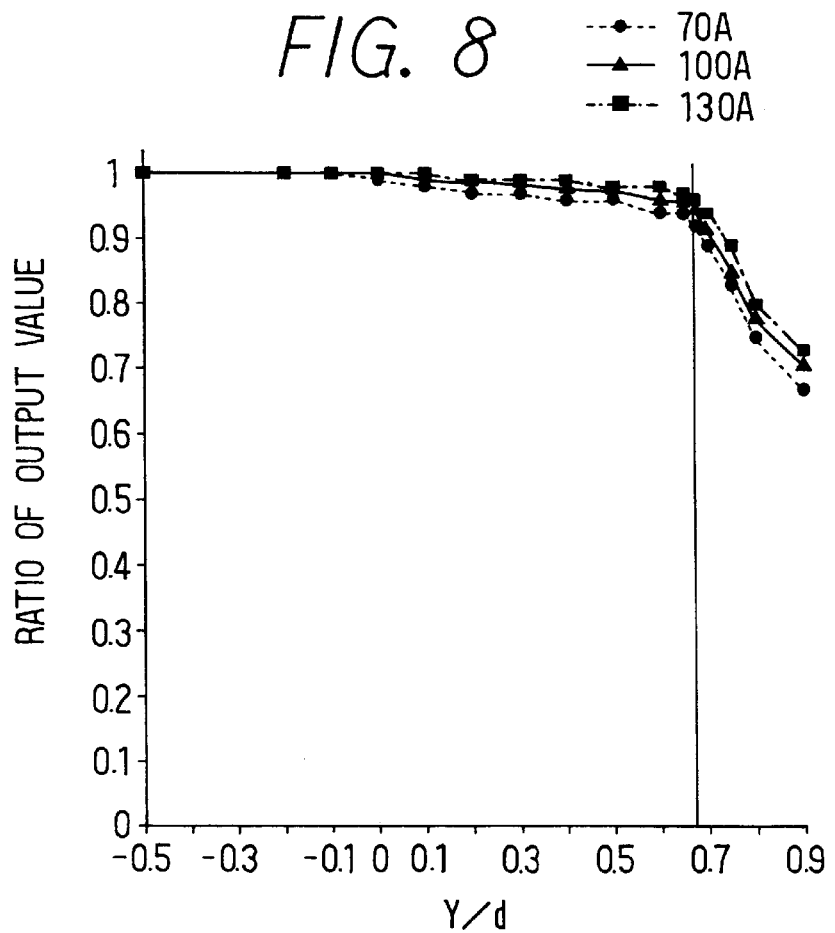
FIG. 8 is a graph showing a relationship between a diametrical position of the through-bolt and an output.

While in the first embodiment, there is controlled the position in the case where the center shaft of the through-bolt 13 for preventing the looseness of the bolt is outside the outer periphery of the stator core 32, in the case where the center shaft of the through-bolt 13 is arranged further internally of the outer periphery of the stator core 32, even if how the through-bolt 13 functions as a magnetic path, a gap is present and therefore a problem of lowering output caused by increase of the gap is not solved. The ratio Y/d is varied to examine the variation of output values of the generator, as shown in FIG. 7. Assume that D is the imaginary largest outside diameter of the stator core 32, d is the diameter of the largest inscribed circle of the axial section of the through-bolt 13, and Y is a distance between the axial center of the through-bolt 13 and the imaginary largest outside circle C1. In generators of classes in which rated outputs are 70A, 100A, and 130A, respectively, a saturated output at ambient temperature of 20° C. and 5,000 rpm is measured. Suppose that Y/d=−0.5, that is, an output value in the case where no recess 38 is present is set to 1, and the ratio of the output values caused by the increase in Y is shown in FIG. 8. Four through-bolts 13 are used whose size is M5 generally used in the AC generator for vehicles of this class. It has been found from FIG. 8 that if Y is set to not more than $\frac{2}{3}$ of d, great lowering of output can be suppressed. It is therefore preferable, in terms of retaining a higher output that in addition to the first embodiment, the distance between the axial center of the through-bolt 13 and the imaginary largest outside circle C1 of the stator core 32 is not more than $\frac{2}{3}$ of the diameter d of the through-bolt 13.

Therefore, the centers of the through-bolts 13 are arranged on or out of a second prescribed circle. The second prescribed circle has a diameter D2 which is smaller than the imaginary largest diameter D of the stator core 32 by $2 \times \frac{2}{3}$ of the diameter d of the through-bolt.

The diameter D2 is represented by $D2=D-2\times\frac{2}{3}\times d$.

Further, the through-bolt 13 is generally circular in axial section but a polygonal section may be employed. In this case, for a dimension set forth in the present invention, a diameter of the largest inscribed circle may be used.

While a through-hole for the through-bolt 13 is provided in one frame flange and a threaded hole is provided in the other frame flange, through-holes may be provided in both the flanges and they can be fastened and fixed using bolts and nuts.

While the frame flange is projected diametrically from the outer periphery of the frame, in the case where the flange is close to a mounting stay portion of a loading frame projected diametrically from the outer periphery of the frame similar to the flange for loading the generator on the engine, a part of the stay portion may be jointly used with the flange.

INDUSTRIAL APPLICABILITY

As described above, according to the present invention, it is possible to provide an AC generator for vehicles in which the recesses 38 are provided in an axial direction of the outer peripheral portion of the stator core 32, the axial center position of the through-bolt 13 guided by the recesses 38 is controlled whereby the moment component when the through-bolt 13 is axially mounted is considerably reduced to prevent an occurrence of looseness of the through-bolt 13 and which prevents output from lowering, is small in size, is excellent in the resistance to vibration and is low in noise.

What is claimed is:

1. An AC generator for a vehicle with a helical stator having bolt recesses on an outer cylindrical surface, comprising:

a field rotor having a fan on at least one axial end;

a stator arranged opposite of an outer periphery of said rotor, said stator comprising a laminated core having a plurality of slots on a radial inside;

a stator coil housed in at least one of said slots; and a housing having a pair of bowl-shaped frames made of aluminum supporting said rotor and said stator and a plurality of through-bolts which engages said pair of bowl-shaped frames for axially fastening and fixing said stator with said pair of bowl-shaped frames, wherein said stator core is provided with a helically wound and laminated band-like steel plate to form a substantially cylindrical shape having a substantially circular outer periphery, said stator having a yoke positioned on a radial outside of said plurality of slots, said yoke having opposite ends placed in contact with respective axial end surfaces of said bowl-shaped frames, said yoke having a plurality of axially depressed recesses formed in said outer peripheral, said recesses forming depressions on radial outsides of said opposite ends, wherein each of said through-bolts is located in respective one of said depressed recesses so that axial centers of said through-bolts are arranged on or within a first prescribed circle having a diameter which is larger than the largest outside diameter of said stator core by $2\times\frac{1}{3}$ of a diameter of said through-bolt and so that axial centers of said through-bolts are arranged on or out of a second prescribed circle having a diameter which is smaller than the largest outside diameter of said stator core by $2\times\frac{2}{3}$ of the diameter of said through-bolt, and wherein said opposite ends have receiving regions being lain on both circumferential sides of said depressions for receiving fastening force of said through-bolts.

2. The AC generator for a vehicle with a helical stator having bolt recesses on an outer cylindrical surface according to claim 1, wherein said laminated core is joined by welding along an axial direction of a surface of said recesses.

3. The AC generator for a vehicle with a helical stator having bolt recesses on an outer cylindrical surface according to claim 1, wherein the outer peripheral surface of said through-bolt is closed to said recess in a portion of said through-bolt that is opposed to said recess.

4. The AC generator for a vehicle with a helical stator having bolt recesses on an outer cylindrical surface according to claim 1, wherein at least a portion of said stator coil is positioned in said slots, said slots being substantially rectangular in shape and being at least partially filled with a plurality of coils.

5. The AC generator for a vehicle with a helical stator having bolt recesses on an outer cylindrical surface according to claim 1, wherein said bowl-shaped frames have holes at both ends of said recesses in which said through-bolts are located respectively, and wherein each of said recesses is semicircular having a bottom located slightly inner than a radial innermost of said hole.

6. The AC generator for a vehicle with a helical stator having bolt recesses on an outer cylindrical surface according to claim 5, wherein said bowl-shaped frames have cover portions located radial outside of said holes, said cover portions being axially extended from said bowl-shaped frames so that said through-bolts are placed between said recesses and said cover portions.

7. The AC generator for a vehicle with a helical stator having bolt recesses on an outer cylindrical surface according to claim 6, wherein said cover portions and said through-bolts form radial gaps larger than gaps formed between said bottom surfaces. of said recesses and said througn-bolts.

8. The AC generator for a vehicle with a helical stator having bolt recesses on an outer cylindrical surface according to claim 1, wherein each of said through-bolts is partially protruded from the largest outside diameter of said stator core.

9. The AC generator for a vehicle with a helical stator having bolt recesses on an outer cylindrical surface according to claim 8, wherein each of said recesses has a semicircular surface having a diameter slightly larger than that of said through-bolt.

10. The AC generator for a vehicle with a helical stator having bolt recesses on an outer cylindrical surface according to claim 1, wherein each of said recesses has a depth which is insufficient to locate said through-bolt within the largest outside diameter of said stator core.

11. An AC generator for a vehicle with a helical stator having bolt recesses on an outer cylindrical surface, comprising:

a field rotor having a fan on at least one axial end;

a stator arranged opposite of an outer periphery of said rotor, said stator comprising a laminated core having a plurality of slots on a radially inner side;

a stator coil housed in at least one of said slots; and a housing having a pair of bowl-shaped frames made of aluminum supporting said rotor and said stator and a plurality of through-bolts which engages said pair of bowl-shaped frames for axially fastening and fixing said stator with said pair of bowl-shaped frames, wherein said stator core is provided with a helically wound and laminated band-like steel plate to form a substantially cylindrical shape having a substantially circular outer periphery, said stator having a yoke positioned on a radially outer side of said plurality of slots, said yoke having opposite ends placed in contact with respective axial end surfaces of said bowl-shaped frames, said yoke having a plurality of axially depressed recesses formed in said outer peripheral, said recesses forming depressions on radially outer sides of said opposite ends, wherein each of said through-bolts is located in respective one of said depressed recesses so that axial centers of said through-bolts are arranged on or within a first prescribed circle having a diameter which is larger than the largest outside diameter of said stator core by $2 \times \frac{1}{3}$ of a diameter of said through-bolt, wherein said opposite ends have receiving regions being lain on both circumferential sides of said depressions for receiving a fastening force of said through-bolts, wherein said bowl-shaped frames have holes at both ends of said recesses in which said through-bolts are located respectively, wherein each of said recesses is semicircular having a bottom located slightly inner than a radial innermost of said hole, wherein said bowl-shaped frames have cover portions located radial outside of said holes, said cover portions being axially extended from said bowl-shaped frames so that said through-bolts are placed between said recesses and said cover portions, and wherein said cover portions and said through-bolts form radial gaps larger than gaps formed between said bottom surfaces of said recesses and said through-bolts.

12. The AC generator for a vehicle with a helical stator having bolt recesses on an outer cylindrical surface according to claim 11, wherein said axial centers of said through-bolts are arranged on or out of a second prescribed circle having a diameter which is smaller than the largest outside diameter of said stator core by $2 \times \frac{2}{3}$ of the diameter of said through-bolt.

13. The AC generator for a vehicle with a helical stator having bolt recesses on an outer cylindrical surface according to claim 11, wherein said laminated core is joined by welding along an axial direction of a surface of said recesses.

14. The AC generator for a vehicle with a helical stator having bolt recesses on an outer cylindrical surface according to claim 11, wherein the outer peripheral surface of said through-bolt is closed to said recess in a portion of said through-bolt that is opposed to said recess.

15. The AC generator for a vehicle with a helical stator having bolt recesses on an outer cylindrical surface according to claim 11, wherein at least a portion of said stator coil is positioned in said slots, said slots being substantially rectangular in shape and being at least partially filled with a plurality of coils.

16. The AC generator for a vehicle with a helical stator having bolt recesses on an outer cylindrical surface according to claim 11, wherein each of said through-bolts is partially protruded from the largest outside diameter of said stator core.

17. The AC generator for a vehicle with a helical stator having bolt recesses on an outer cylindrical surface according to claim 16, wherein each of said recesses has a semicircular surface having a diameter slightly larger than that of said through-bolt.

18. The AC generator for a vehicle with a helical stator having bolt recesses on an outer cylindrical surface according to claim 11, wherein each of said recesses has a depth which is insufficient to locate said through-bolt within the largest outside diameter of said stator core.

* * * * *